United States Patent
Yusuf et al.

(10) Patent No.: US 9,592,488 B2
(45) Date of Patent: Mar. 14, 2017

(54) PROCESS FOR PREPARING LIPID COATED PARTICLES OF PLANT MATERIAL

(71) Applicant: SAUDI ARABIAN OIL COMPANY, Dhahran (SA)

(72) Inventors: Zaki Yusuf, Dhahran (SA); Bandar Fadhel, Dhahran (SA); Ahmad D. Hammad, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 16 days.

(21) Appl. No.: 14/708,659

(22) Filed: May 11, 2015

(65) Prior Publication Data

US 2015/0251156 A1    Sep. 10, 2015

Related U.S. Application Data

(62) Division of application No. 13/893,653, filed on May 14, 2013, now abandoned.

(60) Provisional application No. 61/714,906, filed on Oct. 17, 2012.

(51) Int. Cl.
| | |
|---|---|
| *B01J 20/22* | (2006.01) |
| *B01J 20/32* | (2006.01) |
| *C02F 1/28* | (2006.01) |
| *C02F 1/40* | (2006.01) |
| *C09K 3/32* | (2006.01) |
| *E02B 15/00* | (2006.01) |
| *B01D 17/02* | (2006.01) |
| *B01J 20/28* | (2006.01) |
| *B01J 20/30* | (2006.01) |
| *E02B 15/10* | (2006.01) |
| *C02F 101/32* | (2006.01) |
| *C02F 103/08* | (2006.01) |
| *C02F 103/00* | (2006.01) |

(52) U.S. Cl.
CPC .......... *B01J 20/22* (2013.01); *B01D 17/0202* (2013.01); *B01J 20/28004* (2013.01); *B01J 20/28016* (2013.01); *B01J 20/28019* (2013.01); *B01J 20/305* (2013.01); *B01J 20/3231* (2013.01); *B01J 20/3293* (2013.01); *C02F 1/286* (2013.01); *C02F 1/288* (2013.01); *C02F 1/40* (2013.01); *C09K 3/32* (2013.01); *E02B 15/00* (2013.01); *B01J 20/3206* (2013.01); *B01J 2220/4825* (2013.01); *C02F 2101/32* (2013.01); *C02F 2103/007* (2013.01); *C02F 2103/08* (2013.01); *E02B 15/101* (2013.01)

(58) Field of Classification Search
CPC .. B01J 20/3231; B01J 20/3293; B01J 20/305; B01J 20/22; B01J 2220/4825; B01J 20/28004; B01J 20/3206; C02F 1/286; C02F 1/288; C02F 1/40; E02B 15/00; E02B 15/101
See application file for complete search history.

(56) References Cited

U.S. PATENT DOCUMENTS

| | | | |
|---|---|---|---|
| 4,072,794 A | 2/1978 | Tomita et al. | |
| 4,172,039 A | 10/1979 | Akiyama | |
| 4,444,148 A | 4/1984 | Lander | |
| 5,492,881 A | 2/1996 | Diamond | |
| 6,027,652 A | 2/2000 | Hondroulis et al. | |
| 2015/0231599 A1* | 8/2015 | Dutkiewicz | B01J 20/223 502/401 |

FOREIGN PATENT DOCUMENTS

| | | |
|---|---|---|
| WO | 98/45018 | 10/1998 |
| WO | 2012/136981 A2 | 10/2012 |
| WO | 2012136981 A2 | 10/2012 |

OTHER PUBLICATIONS

Notification Concerning Transmittal of International Preliminary Report on Patentability for PCT/US2013/040893 mailed Apr. 30, 2015.
Shashwat S. Banerjee, et al., "Treatment of oil spill by sorption technique using fatty acid grafted sawdust," Chemosphere, 64:1026-1031 (2006).
S.A. Sayed, et al., "Investigation of the effectiveness of some adsorbent mateirals in oil spill clean-ups," Desalination, 194:90-100 (2006).
T.R. Annunciado, et al., "Experimental investigation of various vegetable fibers as sorbent materials for oil spills," Marine Pollution Bulletin, 50:1340-1346 (2005).
O.K. Karakasi, et al., "Surface modification of high calcium fly ash for its application in oil spill clean up," Fuel, 89:3966-3970 (2010).
Onuma Carmody, et al., "Adsorption of hydrocarbons on organo-clays-Implications for Oil," Journal of Colloid and Interface Science. 305:17-24 (2007).
D. Angelova, et al., "Kinetics of oil and oil products adsorption by carbonized rice husks," Chemical Engineering Journal, 172:306-311 (2011).
Chitsan Lin, et al., "Recycling waste tire powder for the recovery of oil spills," Resources, Conservation and Recycling, 52:1162-1166 (2008).

* cited by examiner

*Primary Examiner* — Matthew O Savage
(74) *Attorney, Agent, or Firm* — Abelman, Frayne & Schwab

(57) ABSTRACT

The invention relates to methods for making completely biodegradable, hydrophobic, oleophilic plant based materials which are useful in adsorption of petroleum products. The materials have an average diameter of from 1 to 5 mm, and an ash content of from 10% to 30%. The non-paraffin coating is an animal fat product, preferably produced by dissolving a pure animal fat and using this as the coating material.

4 Claims, No Drawings

PROCESS FOR PREPARING LIPID COATED PARTICLES OF PLANT MATERIAL

RELATED APPLICATION

This application is a divisional of U.S. patent application Ser. No. 13/893,653 filed May 14, 2013, which claims priority from U.S. Provisional Patent Application No. 61/714,906 filed Oct. 17, 2012, incorporated by reference in their entirety.

FIELD OF THE INVENTION

This invention relates to completely biodegradable, hydrophobic, oleophilic plant based materials which are useful in adsorption of crude oil, and other petroleum products, especially from spills in water. More particularly, it relates to plant particles (date palm tree particles, e.g.), which have had their normally hydrophilic surfaces modified by non-paraffin lipid materials, resulting in hydrophobic particles which are oleophilic and selectively adsorb oil and repel water.

BACKGROUND AND PRIOR ART

Every day, tens of millions of barrels of oil are transported over bodies of water which are also important sources of food and drinking water to millions of people. Oil spills, of course, have a tremendous negative impact on marine life, potable water, and create a "ripple effect" in, e.g., the tourist industry, health care in affected areas, etc. As the world's demand for crude oil continues to grow, the need to have effective remedies available to address oil spills quickly, and effectively does as well.

Plant based materials are well known as oil adsorbing materials. Their efficacy, however, is hindered when the oil material to be adsorbed is combined with water. The chemical composition of plant materials is such that they are hydrophilic, and will adsorb water more readily than petroleum products. Further, when these plant materials adsorb water, they become heavy and sink.

There have been attempts made to use plant materials to remove oil spills. For example, see Banerjee, et al., Chemosphere, 64:1026-1031 (2006); Sayed, et al., Desalination, 194:90-100 (2006); Annunciado, et al., Marine Pollution Bulletin, 50:1340-1346 (2005); Karakasi, et al., Fuel, 89:3966-3970 (2010); and Carmody, et al., J. Colloid and Interface Sci., 305:17-24 (2007). Annunciado and Banerjee are the most relevant of these, as they deal with plant materials for oil adsorption. U.S. Pat. No. 4,444,148 to Lander teaches coating plant materials with paraffin, to render them buoyant and hydrophobic. The invention disclosed herein, however, differs markedly from what is disclosed in the prior art. In the case of Banerjee et al., fatty acids are grafted onto plant materials, using $H_2SO_4$ as the catalyst, whereas the invention, as will be seen herein, involves physical coating without the use of a grafting catalyst. Further, the preferred coating materials of Banerjee et al., are low molecular weight lipids which are liquid at room temperature, as compared to the preferred materials of the invention, which are animal fats and solid at room temperature. Also, Banerjee et al. state that particles of 227 μm were the optimal size for oil adsorption. Experience has shown, however, that particles of this small size are not buoyant, and thus are not useful for removal of oil from bodies of water. Also, Annunciado states that smaller particles adsorb oil at a much lower rate than do the particles of the invention.

There have been various additional approaches to the problem of removing hydrocarbon spilled as a result of various actions. U.S. Pat. No. 5,492,881 to Diamond describes various products which can be used to absorb hydrocarbon, such as oil. Cellulose materials are treated to render products hydrophobic and oleophilic. Options include the incorporation of microbes, a fire retardant, low ash content (1%), and incorporation of paraffin. Removal of spilled petroleum products using bacteria is an inherently slow process because of the biological reaction. Such is not a feature of the present invention. U.S. Pat. No. 4,072,794 to Tomita et al. coats fibers with paraffin, and also includes latex in the composition. Latex is not biodegradable, in contrast to the invention described herein.

International application WO 2012/136981 converts plant materials to charcoal, with dimineralizing. Hence, natural, untreated plant materials are not used.

U.S. Pat. No. 4,172,039 to Akiyama describes use of coir dust, i.e., material from coconut fruit. Coir dust has different porosity from the materials of the invention. The difference in composition requires the use of a containment means in using the coir based product, in contrast to the invention described herein.

WO 1998/45018 describes a product based upon coconut palms, where no hydrophobic coating is utilized.

None of these references teach or suggest the invention described herein and elaborated upon in the disclosure which follows.

SUMMARY OF THE INVENTION

The invention relates to plant materials, coated directly with lipid materials, to render them hydrophobic, and useful as adsorbents for oil and petroleum products, both in the presence of water, and when "dry."

DETAILED DESCRIPTION OF PREFERRED EMBODIMENTS

The present invention utilizes inexpensive materials, e.g., trimmings or other waste materials, from plant sources. Preferably, the plant source is the date palm tree. The trunks of date palm trees are composed of large amounts of lignocellulose, which is itself composed of lignin, cellulose, and hemi-celluloses. In turn, the building blocks of lignin are phenyl propanoid units, while hexoses and pentoses make up cellulose and hemi-cellulose. The biopolymers have strong affinity for water molecules. When water attaches to these polymers via hydrogen bonding, the materials become very poor adsorbents for oil and other petroleum products.

The inventors have discovered, however, that when these plant materials were coated with hydrophobic material, e.g., lipids dissolved from solid animal fats, the resulting, coated particles lost their ability to form hydrogen bonds with water, and retained their ability to adsorb the aforementioned petroleum products. In addition, the resulting coated particles became, and remained buoyant, and thus can be removed very easily following their use as oil adsorbents.

The particles of the invention, as noted supra, are made from plant materials, preferably date palm tree derived materials, e.g., trimmings or other waste products from the tree. These trimmings are referred to by one author as "petiole" or as "karab" in Arabic. See Agoudjil, et al., Energy and Buildings, 43:491-497 (2011), incorporated by reference. Alternatively, one may refer to the petioles of the tree; Material from the trunk are also preferred, although "karab" will be exemplified herein.

Once the karab is gathered, it is treated to remove any moisture therefrom. Preferably, this is done by drying the material in an oven at a temperature sufficient to drive off the water, but insufficient to damage or to char the lignocellulose. Once dried, the material is treated to yield particles of the desired size. These may range from about 0.1 to about 10 mm; however, it has been found that producing particles with an average diameter of less than 1 mm greatly increases the cost of manufacture, while also increasing the available surface area for oil adsorption. In balancing cost and surface area for adsorption, diameters of from 1-5 mm are preferred. The particle compositions contain from about 10% to about 30% ash.

To elaborate, smaller sized particles expose more of the interior, porous portions of the particles to the crude oil, to facilitate absorbency therein. The penetration of oil into the interior of larger particles is much slower; however, smaller particles do tend to sink when placed on water because of its high concentration of minerals such as silica (Si) which have very high densities.

The size of the particles is important because by decreasing the average diameter, the surface area of a given sample of particles increases, which facilitates oil uptake capacity.

Mixtures of particles in the preferred size range with other materials, e.g., particles outside of the preferred size range, as well as other materials, is of course possible, but in addition to the issues discussed supra, it was observed, in experiments, that when a wider range of particle sizes were used, adsorbency was not as efficient. Uncollected, residual oil remained, and additional adsorbent was necessary to remove it all.

Oil uptake results from capillary action, which is defined by an equation, viz.:

$$H = 2\gamma \cos \theta / \rho g r$$

where $\rho$ is fluid density, $\gamma$ is surface tension of the fluid, $\theta$ is the contact angle between the particle surface and the fluid, and $r$ is the capillary radius of the pore.

To explain further, the contact angle $\theta$ depends upon interaction between the material surface, and fluid chemistry. If there is no coating on the surface of the particles, oil and water compete for adsorption. If a water molecule contacts the surface first, the molecule enters a pore of the material, due to hydrogen bonding. Smaller contact angles ($\theta<90$) between the water molecule and the unmodified particles helps water to penetrate the materials and be adsorbed thereby.

When a surface coating is placed on the particles, however, interfacial tension between the water molecules and exterior surface are altered, and both the pore diameters and contact angle increase significantly, with the latter now greater than 90°. Water molecules are thus prevented from entering, i.e., being adsorbed. In contrast, the hydrophobic coating allows oil to enter selectively, a result of the hydrophobicity of the pores and an acute contact angle between the oil and the particles. The pore spaces become filled with oil with no competition from water.

This explanation was validated in experiments, where coated particles in accordance with the invention were kept in water for several days, and neither adsorbed it, nor sank. The plant particles of the invention remain buoyant even after adsorption of petroleum products, such as crude oil.

The particles are coated with hydrophobic lipids, such as animal fat derived lipids. Pure lipids may be used as well as lipids extracted from solid animal fats. Many methods for extracting lipids from solid fats are known, and need not be reiterated here. As shown in the examples which follow, petroleum ether and hexane are especially preferred solvents, but other straight or branched chain alkanes/aliphatics, such as any $C_6$-$C_{12}$ alkane, or mixtures thereof, may be used.

1. The use of solvent extracted lipids is preferred, because when long chain, molecules, which are semi-solid in nature are used, even in pure, dissolved form, the process of coating the particles can result in non-homogeneous, non-uniform products, resulting from the uneven process of solidification during the coating. As is shown in the examples, infra, an advantage of using solvent extraction is the ability to control the removal of the solvent, with pure uniform application of the extracted lipids.

The raw fat used may be any available animal fat. Bovine, ovine, and other source animals may be used.

While not wishing to be bound to any particular theory as to the functioning of the invention, studies have revealed that karab or petiole from date palm trees contains high amounts of mineral residues, i.e., from 5-20%. These mineral residues are Si based, and may contribute to the ability of the particles to adsorb oil and repel water. Analysis of residual as a following combustion, showed the information on mineral content environmental electron microscopy/Energy Dispersive X-ray with (ESEM/EDX tests, both confirmed these findings.

Features of the invention will now be seen by way of the examples which follow.

EXAMPLE 1

This example describes the manufacture of the particles of the invention. Date tree trimmings (referred to hereafter as "karab" or "petiole") were collected, washed thoroughly, and then dried, overnight, at 105° C. After drying, the trimmings were chipped into smaller pieces, and then milled to achieve particles ranging from 1-5 mm in size. These particles were then dried again, to remove any residual water.

Animal fat (sheep fat), was used as the source of the materials used to coat the particles. Samples of the animal fat were placed in the thimbles of two different Soxhlet extractors with two different solvents and two parallel extractions were carried out. To elaborate, i.e., either hexane or petroleum ether, was placed in a still pot of a Soxhlet setup, in a manner well known to one of ordinary skill in the art. This resulted in selected extraction of lipids from the solid animal fat, into the liquid solvents. This was continued for different lengths of time (up to four hours) to obtain saturated solutions for optimum coating.

Solvents into which fats were dissolved were separated from the two different (parallel) Soxhlet extractions, and portions of the particulate trimmings were mixed together with each of the solvents in two different Rotavap vessels. Sufficient solvent was used to completely submerge the particles in two separate rotary evaporators (Rotavap) device. The materials were mixed this way so that particles could be uniformly coated, with the condenser of the device operating at a start temperature below that of the boiling point of the solvent so as to avoid premature vaporization.

After a maximum mixing time of 20 minutes, the temperature in the Rotavaps were raised, so as to evaporate the solvent as completely as possible. Any residual solvent was removed via drying in an oven at a temperature above the solvent boiling point. If necessary all steps were repeated.

Two samples resulted from two different Soxhlet extractions, i.e., one coated with the fat substance dissolved in hexane, and the other coated with fat substances extracted into petroleum ether. It was observed that the particles coated with the hexane extract had a very strong, unpleasant odor, while those coated with the petroleum ether extract, did not.

In further experiments not elaborated upon herein, it was determined that branched fatty acids, such as 4-methyloctanoic acid 4-ethyloctanoic acid, and 4-methylnonanoic acid, are the cause of unpleasant odors in the extracts. These branched fatty acids were extracted into n-hexane, but not petroleum ether.

The examples which follow describe experiments using the particles coated with the petroleum ether extract; however, experiments were also carried out using the hexane extract. These particles functioned in the same way the particles coated with the petroleum ether extract did, but were less desirable due to the foul aroma associated with them.

EXAMPLE 2

The resulting coated particles were hydrophobic, which was shown by placing 3 g of coated particles, and 3 g of uncoated particles, in separate, equal portions of water. After ten minutes, the uncoated particles had adsorbed the water, while the coated particles did not. Also, they remained afloat with minimal or no adsorption of water. Similar tests were carried out with stirring of the water for five minutes. The results were promising. Similar experiments were carried out for overnight in stagnant water to test water repellency. These tests also showed very encouraging results.

EXAMPLE 3

Comparative tests were then carried out where coated, and uncoated particles, were added to containers holding the same amounts of both water, and crude oil. As with Example 2, equal quantities of the particles were added. Given their different densities, the crude oil floated on top of the water in each sample.

The uncoated particles adsorbed the water and, to the extent any oil was removed, it was a result of disturbance when the particles were removed from the container. In contrast, the coated particles adsorbed no water, but instead selectively adsorbed the crude oil. When the coated particles were removed, essentially clean, crude oil free water remained.

The foregoing examples set forth a method for preparing an oil adsorbent particulate material, by dissolving a combining plant particulate material in a liquid form of a lipid or lipid mixture, under conditions favoring uniform coating of the particles with the lipid material. The resulting coated particles provide an exemplary product for adsorbing petroleum based products from, e.g., aqueous environments; however, they function in both aqueous and non-aqueous environments.

The plant material particles preferably have a diameter of from about 1 mm to about 5 mm, and are preferably from date palm trees. The petiole or karab of the date palm tree is the preferred source of the particles, but material such as waste from the tree trunks may also be used.

Preferably the lipids used to coat the particles are obtained by dissolving animal fats into a solvent, such as petroleum ether. While pure, liquid lipids may be used, it is preferred to use lipids dissolved in a solvent because, upon evaporation of the solvent, the lipids coat the particles more completely and evenly than pure lipids do. When the lipids are obtained from dissolved animal fats, the resulting product will not be a "pure" lipid, but a mixture of different triglycerides. The skilled artisan recognizes that a triglyceride always contain a glycerol moiety, having bound there to three fatty acid molecules. These molecules may be the same, or different. Fatty acid composition of different animal fats are well known, as evidenced by, e.g., Hilditch, et al, "Sheep Body Fats," (1941), incorporated by reference. Generally, the fatty acids are saturated, and unsaturated hexadecanoic and octadecanoic acids, such as palmitic, oleic, stearic, and linoleic acids. The compositions will vary from animal to animal, but the triglyceride molecules will generally contain at least 50 and preferably at least 55 carbon atoms. Also see Weber, et al, Fuel 94: 262-269 (2012), incorporated by reference.

Referring back to the solvents, it has been observed that certain solvents, e.g., n-hexane or other straight chain alkanes or aliphatics, dissolve branched lipids into the solvent. While these lipids function in the manner described herein, their malodorous qualities makes them less desirable as coating agents for the particles.

In operation, the coated particles are simple to use: one simply deploys them at a source where undesired petroleum products are present for a time sufficient for the particles to adsorb the petroleum products. As was shown, supra, the particles remain buoyant, and can be removed very easily, by standard methods well known to anyone involved in the field.

Further, in contrast to other systems, the compositions of the invention do not incorporate microbes which serve to biodegrade petroleum products. By relying on the oleophilic products of the invention, rapid removal of hydrocarbons is possible, as compared to the slow pace at which bioreactions occur.

In one exemplary embodiment of the invention, particles in accordance with the invention can be placed in a water repellant containment means, such as water repellant meshed nylon, or other appropriate fabrics, so as to provide miniature "booms" which can be used instead of free particles. Such booms" can provide a more efficient way of removing any petroleum products from an aqueous environment.

It must be noted, however, that containment means are not required; rather they serve as a convenience to the user. The distinction is important because other plant based materials, due to their porosity and other facts must be placed in containment means, as they are not buoyant.

Other embodiments of the invention will be clear to the skilled artisan and need not be listed herein.

It should be noted that the particles of the invention were tested and proved to be useful for adsorbing oil from non-aqueous environments as well, such as simple spills on dry surfaces.

When used in an aqueous environment, the nature of the water was not a factor. Tests were carried out in both deionized, and sea water, as well as stagnant and fresh water, and its performance was equivalent in all cases, as well as for different types of oil and petroleum products (e.g., Arab heavy, medium and light crude oil, emulsifier oil, and burnt or used engine oil).

The terms and expression which have been employed are used as terms of description and not of limitation, and there is no intention in the use of such terms and expression of excluding any equivalents of the features shown and described or portions thereof, it being recognized that various modifications are possible within the scope of the invention.

We claim:

1. A process for preparing lipid coated particles of plant material, comprising:
   (a) contacting a solid animal fat with petroleum ether to extract lipids from the solid animal fat thereby forming a mixture of petroleum ether and lipids, wherein the extracted lipids do not contain branched fatty acids;
   (b) admixing particles of a plant material with said mixture, wherein said particles have an average diameter of from about 1 mm to about 5 mm, an ash content of from 10-30%, and from 5-20% silica based mineral residue and have been dried to remove any moisture therefrom;
   (c) coating said particles with said lipids by removing said petroleum ether, and
   (d) drying the lipid coated particles to remove any remaining petroleum ether therefrom.

2. The process of claim 1, wherein said animal fat is sheep fat.

3. The process of claim 2, wherein said plant material is petiole.

4. The process of claim 1, wherein said plant material is from a date palm tree.

\* \* \* \* \*